Patented Jan. 24, 1928.

1,657,255

UNITED STATES PATENT OFFICE.

ARCHIBALD JOHN HALL, OF CONGLETON, ENGLAND, ASSIGNOR TO THE SILVER SPRINGS BLEACHING & DYEING COMPANY LIMITED, OF TIMBERSBROOK, CONGLETON, ENGLAND.

PROCESS FOR DYEING CELLULOSE-ACETATE PRODUCTS IN BLACK SHADES.

No Drawing. Application filed June 10, 1926, Serial No. 115,139, and in Great Britain July 10, 1925.

This invention relates to improved process for dyeing very fast and pleasing black shades on threads, fabrics, films or other products made from or containing cellulose acetate.

Textile materials are frequently dyed in black shades by the application and subsequent oxidation under well known conditions of aniline or mixtures containing aniline and one or more of certain aromatic amines such as o-toluidine, p-phenylenediamine and p-aminodiphenylamine. This method of dyeing, though of considerable importance in the case of cotton, has not been successfully employed in dyeing black shades on cellulose acetate silk.

It has now been discovered, and this discovery forms the essential part of the present invention, that cellulose acetate silk readily absorbs 2:4-diaminodiphenylamine from its aqueous solutions or suspensions or colloidal solutions and that cellulose acetate silk so treated may be easily oxidized with the formation of very fast and pleasing black shades.

The invention may be carried out by two different methods.

In the first method cellulose acetate silk is treated to absorb 2:4-diaminodiphenylamine and then subjected to the action of one or more oxidizing agents until a black shade having the desired properties is obtained. When desirable, these operations may be carried out in rapid succession so that the cellulose acetate silk is dyed black in a continuous manner.

The absorption of 2:4-diaminodiphenylamine by cellulose acetate silk is effected by immersing the silk for a suitable period in a warm aqueous solution or suspension or colloidal solution of 2:4-diaminodiphenylamine. Alternatively the cellulose acetate silk is impregnated or printed with an aqueous solution or suspension or colloidal solution of 2:4-diaminodiphenylamine and subsequently exposed in a suitably heated moist atmosphere until it has completely or sufficiently absorbed the amine.

The oxidation of the 2:4-diaminodiphenylamine absorbed in the cellulose acetate silk is effected by immersing it in aqueous solutions containing one or more well known oxidizing agents such as ferric chloride, a bichromate, a permanganate, a chlorate, a perborate, hydrogen peroxide and bromine, the solutions being made acidic, neutral or alkaline according to the properties of the oxidizing agent or agents used. Further, the treatment with oxidizing agents may be carried out in very hot or boiling solutions to which suitable quantities of protective salts have been added for the purpose of preserving the lustre and other valuable properties of the silk as described in British specification No. 246,879.

In the second method the cellulose acetate silk is impregnated with a mixture containing 2:4-diaminodiphenylamine and one or more oxidizing agents and then exposed to a suitably heated moist atmosphere until the desired black shade is obtained.

It must be clearly understood that the invention is not limited to the use of the oxidizing agents referred to above since many other substances may be used for the purpose.

It has further been discovered that the oxidation may be assisted by the presence of catalysts, particularly the salts of copper, iron, and chromium, but it is recognized that other metallic salts and organic compounds may be used, particularly those which have already been found useful in the dyeing of aniline black.

The chemical oxidizing agents and catalysts used in carrying out my invention are to be regarded as assistants. They are useful but not essential, for it is found that when cellulose acetate silk containing absorbed 2:4-diaminodiphenylamine is exposed to air, it gradually develops a full black shade even when protected from light.

Although black shades of excellent fastness to light, washing, acids and alkalis are obtained on cellulose acetate silk by oxidation of 2:4-diaminodiphenylamine, it has now been discovered that the oxidation may also be carried out in the presence of one or more derivatives of benzine containing at least one primary amino group such as aniline, o-toluidine, p-toluidine, m-phenylenediamine and p-phenylenediamine. The mixtures of amines employed may consist of about 75% of 2:4-diaminodiphenylamine and about 25% of one or more of the amines described above, but it must be clearly understood that this invention is not limited to the use of these proportions.

The following examples indicate some of the methods by which the invention may be carried out to obtain very fast and pleasing black shades:—

*Example 1.*

10 parts of cellulose acetate silk are immersed for 1 hour at 75° C. in a liquor containing 0.75 parts of 2:4-diaminodiphenylamine, 0.60 parts of soap, 0.60 parts of ammonia of specific gravity 0.920, 300.00 parts of water, then rinsed in warm water and immersed for ½ hour at 65° to 70° C. in a liquor containing: 4 parts of sodium chlorate, 25 parts of hydrochloric acid of 28° Tw., 1 part of copper sulphate crystals, 300 parts of water, again rinsed in warm water, soaped at 60° C., rinsed in warm water and dried.

*Example 2.*

2 parts of cellulose acetate silk are immersed for 1 hour at 60° to 75° C. in a liquor containing:—0.15 parts of 2:4-diaminodiphenylamine, 0.12 parts of ammonia of specific gravity 0.920, 0.12 parts of Turkey-red oil, 60.00 parts of water, then rinsed in cold water, hydro-extracted, immersed for 5 minutes at 95° C. in a solution containing:—5.0 parts of sodium chloride, 2.0 parts of hydrochloric acid of 28° Tw., 0.2 parts of copper sulphate crystals, 0.8 parts of sodium chlorate, 50.00 parts of water, and then rinsed in water, soaped at 60° C., rinsed in warm water and dried.

*Example 3.*

5 parts of cellulose acetate silk are immersed for 1 hour at 75° C. in a liquor containing: 0.75 parts of 2:4-diaminodiphenylamine, 0.25 parts of aniline or o-toluidine or p-toluidine or m-phenylenediamine or p-phenylenediamine, 0.60 parts of soap, 0.60 parts of ammonia of specific gravity 0.920, 300.00 parts of water, rinsed in warm water, and oxidized as described in Example 1.

*Example 4.*

1 part of cellulose acetate silk treated as described in Example 1 is oxidized by immersion for 4 minutes at 95° to 100° C. in a solution containing: 20.0 parts of a 10% solution of sodium chloride, 2.0 parts of ferric chloride, 0.1 part of hydrochloric acid of 28° Tw., and then rinsed in water, soaped at 60° C., rinsed in warm water and dried.

*Example 5.*

5 parts of cellulose acetate silk treated as described in Example 1 and oxidized by immersion for 20 minutes at 70° C. in a solution containing: 33.0 parts of a 20% solution of sodium chlorate, 1.0 parts of ferric chloride, 1.5 parts of hydrochloric acid of 28° Tw., 6.0 parts of glacial acetic acid, 300.0 parts of water, then rinsed in water, soaped at 60° C. rinsed in warm water and dried.

*Example 6.*

Cellulose acetate silk fabric is impregnated with a solution containing: 10 parts of 2:4-diaminodiphenylamine, 6 parts of glacial acetic acid, 94 parts of water, then squeezed to remove excess of liquor, exposed for 5 minutes in a warm moist atmosphere at 70° C., then rinsed in warm water and oxidized as described in Example 1 or Example 4.

*Example 7.*

Cellulose acetate silk yarn is impregnated with a solution containing: 10 parts of 2:4-diaminodiphenylamine, 20 parts of Turkey red oil, 1 c. c. of ammonia of 0.920 specific gravity, 80 parts of water, and then exposed to a warm moist atmosphere and oxidized as described in Example 6.

*Example 8.*

Cellulose acetate silk fabric or yarn is printed with a solution containing: 10 parts of 2:4-diaminodiphenylamine, 3 parts of glacial acetic acid, 6 c. c. of hydrochloric acid of 28° Tw., 4 parts of sodium chlorate, 0.5 parts of copper sulphate, then exposed for 5 minutes in a warm moist atmosphere at 70° C., rinsed in warm water, soaped at 60° C., and then rinsed in warm water and dried.

What I claim as my invention and desire to protect by Letters Patent is:—

1. Process for the production of black shades on cellulose acetate products comprising treating such products with 2:4-diaminodiphenylamine and subjecting them to the action of an oxidizing agent.

2. Process for the production of black shades on cellulose acetate products comprising treating such products with 2:4-diaminodiphenylamine and derivative of benzine containing at least one primary amino group and subjecting them to the action of an oxidizing agent.

3. Process for the production of black shades on cellulose acetate products comprising treating such products with 2:4-diaminodiphenylamine and a mixture a derivative of benzine containing at least one primary amino group and subjecting them to the action of an oxidizing agent.

4. Process for the production of black shades on cellulose acetate products comprising treating such products with 2:4-diaminodiphenylamine and subjecting them to the action of an oxidizing agent in the presence of a known aniline catalyst.

5. Process for the production of black shades on cellulose acetate products comprising treating such products with 2:4-diaminodiphenylamine and subjecting them to the action of an oxidizing agent, the process being carried out in hot liquors to which suitable amounts of protective salts are added for the purpose of preserving the lustre and other qualities of the cellulose acetate products.

6. Cellulose acetate products dyed in black shades by the oxidation of 2:4 diaminodiphenylamine.

7. Cellulose acetate products dyed in black shades by the oxidation of 2:4-diaminodiphenylamine and a derivative of benzine containing at least one primary amino group.

8. Process for the production of black shades on cellulose acetate products comprising treating such products simultaneously with 2:4-diaminodiphenylamine and an oxidizing agent.

In testimony whereof I have hereunto set my hand this 1st day of June, 1926.

ARCHIBALD JOHN HALL.